United States Patent
Conley

(10) Patent No.: US 10,670,141 B1
(45) Date of Patent: Jun. 2, 2020

(54) MULTI-FUNCTION VEHICLE CONTROL DEVICE

(71) Applicant: John Jason Conley, Maidsville, WV (US)

(72) Inventor: John Jason Conley, Maidsville, WV (US)

( * ) Notice: Subject to any disclaimer, the term of this patent is extended or adjusted under 35 U.S.C. 154(b) by 182 days.

(21) Appl. No.: 15/872,767

(22) Filed: Jan. 16, 2018

Related U.S. Application Data

(60) Provisional application No. 62/446,718, filed on Jan. 16, 2017.

(51) Int. Cl.
| | |
|---|---|
| *F16H 59/20* | (2006.01) |
| *F02D 11/10* | (2006.01) |
| *G05G 1/38* | (2008.04) |
| *B60K 26/02* | (2006.01) |
| *F02D 11/02* | (2006.01) |
| *F16H 61/02* | (2006.01) |

(52) U.S. Cl.
CPC ............ *F16H 59/20* (2013.01); *B60K 26/02* (2013.01); *F02D 11/02* (2013.01); *F02D 11/105* (2013.01); *F02D 11/106* (2013.01); *G05G 1/38* (2013.01); *B60T 2220/04* (2013.01); *B60W 2540/103* (2013.01); *F02D 2200/602* (2013.01); *F16D 2500/31406* (2013.01); *F16H 2061/0244* (2013.01)

(58) Field of Classification Search
CPC ....... B60K 26/02; F02D 11/105; F02D 11/02; F02D 2200/602; B60W 2540/103; F16H 2061/0244; F16D 2500/31406; B60T 2220/04

See application file for complete search history.

(56) References Cited

U.S. PATENT DOCUMENTS

| | | |
|---|---|---|
| 4,669,335 A | 1/1987 | Matsuoka et al. |
| 4,669,435 A | 6/1987 | Furusawa et al. |
| 5,315,900 A | 5/1994 | Teeter |
| 5,553,453 A | 9/1996 | Coutant et al. |
| 5,916,292 A | 6/1999 | Issa et al. |
| 5,954,617 A | 9/1999 | Horgan et al. |
| 6,209,418 B1 | 4/2001 | Kalsi et al. |

(Continued)

FOREIGN PATENT DOCUMENTS

| | | |
|---|---|---|
| CN | 101462493 | 6/2009 |
| CN | 202080192 | 12/2011 |

(Continued)

OTHER PUBLICATIONS

YouTube video about Richie Parker, who was born without arms, showing him driving a car controlled by his feet, Sep. 2, 2013, https://www.youtube.com/watch?v=usuQAYE2ASo.

*Primary Examiner* — Jacob S. Scott
*Assistant Examiner* — Lillian T Nguyen
(74) *Attorney, Agent, or Firm* — William F. Lang, IV; Lang Patent Law LLC

(57) ABSTRACT

A vehicle control device includes a user-depressible portion that in some examples takes the form of a third foot pedal. The user-depressible portion may be depressed to varying degrees and then released to varying degrees. The degree and type of pedal movement is analyzed to determine one of a predetermined plurality of vehicle control functions that the drives wishes to perform.

9 Claims, 6 Drawing Sheets

(56) References Cited

U.S. PATENT DOCUMENTS

| | | |
|---|---|---|
| 6,220,222 B1 | 4/2001 | Kalsi |
| 6,223,112 B1 | 4/2001 | Nishino |
| 6,377,884 B1 | 4/2002 | Loeffler et al. |
| 6,446,500 B1 | 9/2002 | Marquardt et al. |
| 6,474,191 B1 | 11/2002 | Campbell |
| 6,809,512 B2 | 10/2004 | Pfaffenberger et al. |
| 6,948,399 B2 | 9/2005 | Yoshikawa et al. |
| 7,131,347 B2 | 11/2006 | Yoshikawa et al. |
| 7,540,210 B2 | 6/2009 | Mashkevich |
| 7,678,005 B2 | 3/2010 | Tuckfield |
| 8,246,515 B2 | 8/2012 | Zhao |
| 8,340,863 B2 | 12/2012 | Karatsinides |
| 8,393,240 B2 | 3/2013 | Wolterman |
| 8,467,930 B2 | 6/2013 | Kimura et al. |
| 9,002,597 B2 | 4/2015 | Sata |
| 9,096,216 B1 | 8/2015 | Kucharski et al. |
| 9,133,784 B2 | 9/2015 | Seaman et al. |
| 9,175,617 B2 | 11/2015 | Scavone et al. |
| 9,248,810 B2 | 2/2016 | Olofsson |
| 9,248,822 B2 | 2/2016 | Hyun |
| 9,404,570 B2 | 8/2016 | Ribero |
| 2001/0015111 A1 | 8/2001 | Rixon et al. |
| 2001/0047696 A1 | 12/2001 | Fukase et al. |
| 2002/0056337 A1 | 5/2002 | Sundaresan et al. |
| 2005/0274217 A1 | 12/2005 | Dubay et al. |
| 2009/0178647 A1 | 7/2009 | Wang |
| 2012/0143420 A1 | 6/2012 | Fisker et al. |
| 2013/0024090 A1* | 1/2013 | Minase ............ B60W 30/1882 701/102 |
| 2013/0046450 A1 | 2/2013 | Gentile et al. |
| 2014/0297153 A1 | 10/2014 | Takagi et al. |
| 2015/0128755 A1* | 5/2015 | Kaijala ................ G05G 25/04 74/514 |
| 2016/0004271 A1 | 1/2016 | Gregory et al. |
| 2016/0076638 A1 | 1/2016 | Taka et al. |
| 2016/0202719 A1 | 7/2016 | Lippman et al. |

FOREIGN PATENT DOCUMENTS

| | | |
|---|---|---|
| DE | 102005002265 | 8/2006 |
| EP | 0 507 745 | 10/1992 |
| EP | 0 838 362 | 4/1998 |
| EP | 1 186 805 | 10/2003 |
| JP | 2000002320 | 1/2000 |

* cited by examiner

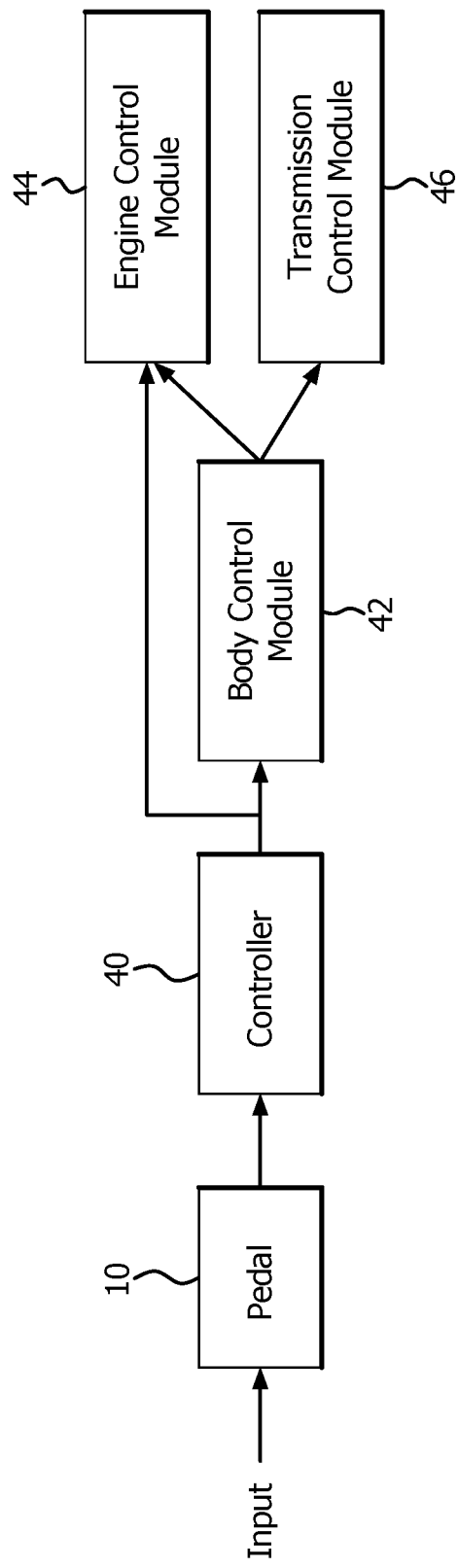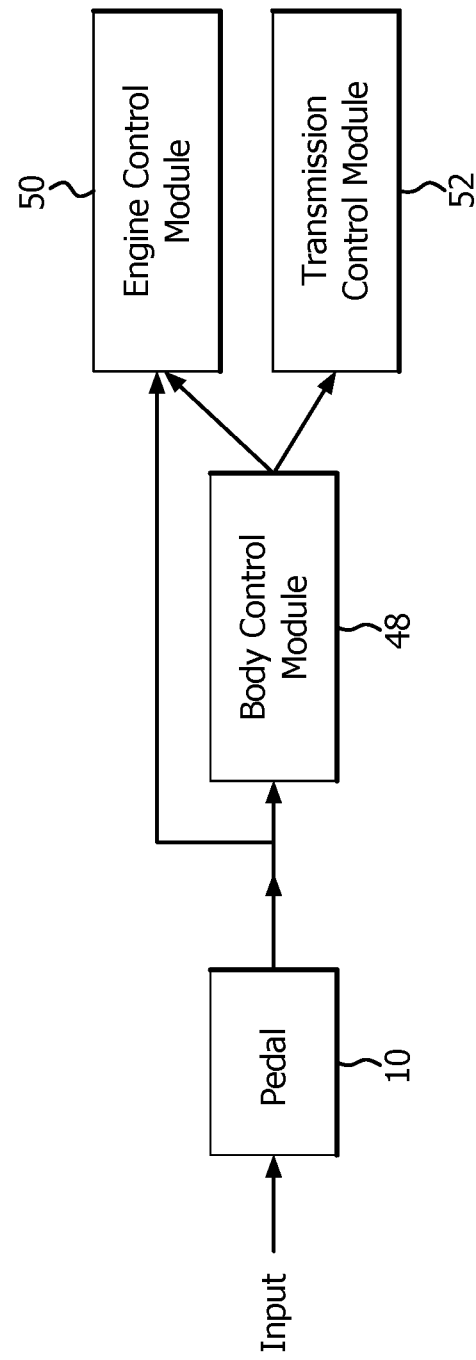

MULTI-FUNCTION VEHICLE CONTROL DEVICE

CROSS REFERENCE TO RELATED APPLICATION

This application claims the benefit of U.S. provisional patent application Ser. No. 62/446,718, which was filed on Jan. 16, 2017, and entitled "Multi-Function Vehicle Control Device."

TECHNICAL FIELD

The present invention relates to vehicle control systems. More specifically, a multi-function vehicle control device is provided. Some examples of the multi-function control device may be operated by the driver's left foot.

BACKGROUND INFORMATION

The increasing number of driving modes available for vehicles in general and trucks in particular require a greater number of controls operated by the driver. Many presently available controls for the vehicle mode control systems require the use of the driver's hands, requiring the driver to take his hands off the steering wheel, and possibly his eyes off the road. Additionally, electric motors provide yet another group of mode selection options which must be controlled.

At the same time, the increasing use of automatic transmissions, as well as automated manual transmissions (manual transmissions with automatic clutching, which often include an automatic shifting mode), has made the use of the left foot unnecessary while driving. Thus, while an increasing number of controls requires the use of the driver's hands, the left foot goes completely unused.

Numerous examples of vehicle control systems and devices presently exist. Similarly, numerous vehicle systems could potentially be implemented with a multi-function vehicle control such as a third vehicle foot pedal. Several non-inclusive examples of prior art vehicle controls are listed below, with many of these references disclosing functions that could potentially be implemented utilizing the vehicle control device of the present invention. The entire disclosure of each and every patent and patent application mentioned within this specification is expressly incorporated herein by reference.

U.S. Pat. No. 4,669,335, issued to T. Matsuoka et al. on Jan. 2, 1987, discloses a control system for a vehicle automatic transmission. The electronic control unit for the transmission has a plurality of gear shift patterns, including a pattern for a normal mode, a pattern for a power mode, and a pattern for an economy mode.

U.S. Pat. No. 4,669,435, issued to C. Furusawa et al. on Jun. 2, 1987, discloses an exhaust brake control system. When a shift sensor senses that the automatic transmission has been shifted into the L range, the control unit actuates a valve to open the exhaust gas passageway upon the servo hydraulic pressure sensor outputting a signal indicative of a value greater than a predetermined value. Exhaust braking is applied once a sufficiently high servo hydraulic pressure is attained immediately after a downshift.

U.S. Pat. No. 5,315,900, issued to T. E. Teeter on May 31, 1994, discloses a transmission control lever having cruise and engine brake control.

U.S. Pat. No. 5,553,453, issued to A. R. Coutant et al. on Sep. 10, 1996, discloses a method for providing different speed ranges for a speed pedal. The method utilizes a continuously variable transmission having a closed loop control. The output speed of the continuously variable transmission, the position of the speed pedal relative to the transmission output speed, are both monitored. A plurality of control maps are established, with each map having the same travel distance of the speed pedal but different speed ranges.

U.S. Pat. No. 5,916,292, issued to N. M. Issa et al. on Jun. 29, 1999, discloses a method of manually shifting an electronically controlled automatic transmission system. The method begins with determining whether a shift lever in the manual position is erroneously positioned, as well as whether a switch on the shift lever is presenting an error. If no errors are presented, then the temperature of the automatic transmission or engine coolant is compared with a predetermined threshold. If the manual position conditions have been met, then the system determines whether an upshift or downshift is scheduled.

U.S. Pat. No. 5,954,617, issued to M. J. Horgan et al. on Sep. 21, 1999, discloses a system for controlling internal combustion engine performance in accordance with driver behavior. A vehicle control computer receives a plurality of operating parameters signals. The monitored operational states are the result of the manner in which the driver operates the vehicle. The control system will punish or reward the driver performance by making more or less engine output power available.

U.S. Pat. No. 6,209,418, issued to A. S. Kalsi et al. on Apr. 3, 2001, discloses a mechanical kickdown for an electronic throttle control pedal assembly.

U.S. Pat. No. 6,220,222, issued to A. Kalsi on Apr. 24, 2001, discloses an electronic control assembly for a pedal. The pedal includes a sensor that generates a signal that varies in magnitude in proportion to pedal movement.

U.S. Pat. No. 6,223,112, issued to K. Nishino on Apr. 24, 2001, discloses a shift device for an automatic transmission. The shift device includes a steering wheel having an up-down select switch. A range selector hasn't upshift switch and the downshift switch, as well as an automatic mode switch. Some operators shift demands will not result in a transmission shift.

U.S. Pat. No. 6,377,884, issued to J. Loeffler et al. on Apr. 23, 2002, discloses a device for controlling the drivetrain of the vehicle. The operating modes normal, coast down, and kickdown are derived from the gas pedal position, a zero point for the gas pedal, and a kickdown point for the gas pedal. Maximum and minimum power output for the transmission is calculated. The vehicle speed is taken into consideration, and the output required at the kickdown point is limited to the maximum attainable power in each case at the prevailing speed. A driver type dependent characteristic, which is a function of the driver type, is also taken into consideration. An economy oriented driver will have a different characteristic curve than a maximum performance oriented driver.

U.S. Pat. No. 6,446,500, issued to W. K. Marquardt et al. on Sep. 10, 2002, discloses a pedal travel sensor device. The pedal travel sensor is structured to trigger a kickdown in an intermediary position of the pedal. The kickdown results in a transmission shift as well as increased engine power. The pedal must travel past a detent at the intermediary position, resulting in a noticeable increase in the amount of force required to push the pedal once the intermediary position is passed, thus letting the driver note that the position has been passed. The device includes a pair of electrical connections that are brought into contact with an electrically conductive service when the pedal is sufficiently depressed.

U.S. Pat. No. 6,474,191, issued to A. Campbell on Nov. 5, 2002, discloses an electronic accelerator pedal having a kickdown feature. A sensor mechanism generates an electrical signal that changes as a function of the position of the pedal.

U.S. Pat. No. 6,809,512, issued to D. S. Pfaffenberger et al. on Oct. 26, 2004, discloses a pedal with an integrated position sensor. A magnetic field generator generates a magnetic field as the pedal moves. An adjacent magnetic field sensor detects the magnetic field, and generates an electrical signal that is proportional to the strength of the magnetic field.

U.S. Pat. No. 6,948,399, issued to K. Yoshikawa et al. on Sep. 27, 2005, discloses a manual gear shift device for an automatic transmission. The gear shift device includes switches mounted on the spokes of a steering wheel.

U.S. Pat. No. 7,131,347, issued to K. Yoshikawa et al. on Nov. 7, 2006, discloses a manual gear shift device for an automotive automatic transmission. This application is a continuation of U.S. Pat. No. 6,948,399.

U.S. Pat. No. 7,540,210, issued to Michael Mashkevich et al. on Jun. 2, 2009, discloses a switch assembly for selecting among a plurality of shift schedules for an electronically controlled transmission. One of the shift schedules includes a tow/haul state.

U.S. Pat. No. 7,678,005, issued to C. A. Tuckfield on Mar. 16, 2010, discloses a hybrid transmission having sport and economy modes which can be selected by the driver of the vehicle. The transmission includes a continuously variable speed ratio.

U.S. Pat. No. 8,246,515, issued to R. Zhao on Aug. 21, 2012, discloses a method for manually shifting an automatic transmission through the accelerator pedal. An upshift request is generated when the movements of the accelerator pedal matches a predetermined pattern for requesting an upshift, such as a fast upward movements, a quick slowing down, and a downward movement immediately afterward. A downshift request is generated when the movement of the accelerator pedal matches a predetermined pattern for requesting a downshift, such as a fast downward movement of the pedal.

U.S. Pat. No. 8,340,863, issued to D. S. Karatsinides on Dec. 25, 2012, discloses a vehicle pedal apparatus with a user activation sensor. A sensor, which is independent from any physical position sensors of the pedal, is capable of detecting when the footpad is actuated and when it is not actuated. A detection circuit which is electrically coupled to the sensor determines the state of the pedal. The operation of the vehicle is influenced by the detected state of the pedal.

U.S. Pat. No. 8,393,240, issued to M. J. Wolterman on Mar. 12, 2013, discloses instrument control pedals for electronically shifted manual transmissions. The system takes into account a gear selection sensor signal, a tactile sensor signal, a clutch pedal position sensor signal, a clutch pedal pressure sensor signal, an engine rotational speed signal, an engine load signal, a vehicle speed signal, a brake pedal position signal, and a throttle position signal. Control signals such as the shift fork actuator and clutch actuator are also provided to the system. When the beginning of the gearshift operation is detected, the system will use the information from these sensors, as well as the shift history, to predict to the desired gear ratio. The system then checks to see if the predicted gear ratio matches the selected gear ratio.

U.S. Pat. No. 8,467,930, issued to T. Kimura et al. on Jun. 18, 2013, discloses a driving mode changing device. The device changes between a normal driving mode, a sports mode utilizing the high revolution range of the engine, and a launch mode intended to facilitate sudden acceleration. A mode changing switch is provided for switching modes. Various sensors such as wheel speed, engine revolutions per minute, steering angle, gradients, accelerator pedal, brake pedal, transmission oil, water temperature, and shift position are utilized to determine whether any abnormalities prevent a transition from normal mode to sport mode. Sport mode is required before transition to launch mode. Various conditions are also monitored to ensure that a transition into launch mode is acceptable when selected by the driver.

U.S. Pat. No. 9,002,597, issued to A. Sata on Apr. 7, 2015, discloses a system for controlling gear changes in a vehicle. The system includes a primary paddle shifter coupled to the steering wheel or steering column. An auxiliary paddle shifter is coupled to the steering wheel, steering column, or the primary paddle shifter. The primary paddle shifter controls sequential up and down gear shifting. The auxiliary paddle controls optimal gear shift up or down.

U.S. Pat. No. 9,096,216, issued to J. E. Kucharski et al. on Aug. 4, 2015, discloses a method of providing brake pedal activated downshifts. A brake pedal tap, in which the brake pedal travels less distance, and for a shorter duration, then normal brake operation, is used to activate a downshift. Multiple step downshifts can be triggered by closely spaced taps or by longer pedal taps. The transmission remains in the lower gear until an exit condition such as an elapsed time is reached.

U.S. Pat. No. 9,133,784, issued to J. R. Seaman et al. on Sep. 15, 2015, discloses a vehicle having a normal operating mode and a performance operating mode. A unique removable key for each of vehicle must be detected in order to enter performance mode. Performance mode may result in adjusting valve timing, adjusting idle speed control, adjusting torque response, and/or enhancing engine braking. Performance mode operation may also disable features such as a transmission skip shift feature.

U.S. Pat. No. 9,175,617, issued to L. Scavone et al. on Nov. 3, 2015, discloses a system for controlling exhaust braking in a vehicle. Exhaust braking is performed by cutting off fuel delivery to the cylinders of an engine and closing off the exhaust path from the engine, causing exhaust gases to be compressed in the exhaust manifold of the engine and in the cylinders of the engine. In vehicles equipped with a variable geometry turbocharger, the vanes of the variable geometry turbocharger are adjusted to close the exhaust path. An engine control module may enable or disable exhaust braking based on conditions such as the transmission being in drive or in another gear, engine coolant temperature being above a predetermined threshold, detection of a fault in the exhaust hardware, or detection of a fault in the transmission. Exhaust gas pressure is determined. The maximum pumping losses are also determined. These values are used to calculate exhaust brake capacity. When an exhaust brake torque request is received from the driver, the target pumping losses are calculated and compared to the maximum pumping losses. Engine speed and intake air pressure are determined. A target vane position is determined, and the vanes are positioned in the appropriate position.

U.S. Pat. No. 9,248,810, issued to E. G. Olofsson on Feb. 2, 2016, discloses an accelerator braking module. The system includes secondary pedals disposed above both the accelerator pedal and the brake pedal, so that the driver's foot depresses the secondary pedal before depressing either the accelerator or the brake. When the driver's foot is not in contact with the accelerator pedal, the braking module causes the brake pedal to be fully depressed. When the driver's foot contacts the secondary pedal above the accelerator, depressing this panel causes the degree of depression of the brake pedal to be reduced, so that when the secondary pedal is fully depressed, the brake pedal is fully released. At this point continued pressure from the driver's foot will depress the accelerator pedal. The secondary pedal above the brake pedal is used to detect the presence of the driver's foot on the brake pedal, thus disabling the system and allowing manual braking.

U.S. Pat. No. 9,248,822, issued to B. Hyun on Feb. 2, 2016, discloses a control apparatus for regenerative braking of an eco-friendly vehicle. A regenerative braking torque map is provided for each gear. When the driver shifts from drive to manual shifting, the amount of regenerative braking may be variably adjusted based on the torque map that corresponds to the selected gear. The torque maps defines the amount of regenerative braking torque based on the vehicle speed. When the gear is manually changed up or down, the torque map for the regenerative braking for the gear selected is used to calculate the torque based on the current vehicle speed and adjust regenerative braking.

U.S. Pat. No. 9,404,570, issued to R. Ribero on Aug. 2, 2015, discloses a control method for an automated gearbox on a vehicle. The automated gearbox operates in a first automatic mode and a second driver initiated mode. Vehicle driving behavior is monitored. The second mode can be a power mode or a kickdown mode. When the driver requests a switch from the first mode to the second mode, the switch is made only if driving behavior is satisfactory. If driving behavior becomes unsatisfactory in the second mode, the system switches back to the first mode.

US 2001/0015111, invented by C. J. Rixon et al. and published on Aug. 23, 2001, discloses an electronic adjustable pedal assembly. The pedal assembly includes a generator having an output that is adapted to be connected to the vehicle system. The generator operates in response to pedal movements, generating electrical control signal that varies in magnitude in proportion to the movement of the pedal.

US 2001/0047696, invented by A. Fukase et al. and published on Dec. 6, 2001, discloses a vehicle pedal assembly having pedals whose nonoperative positions are adjustable in a vehicle longitudinal direction.

US 2002/0056337, invented by S. Sundaresan et al. and published on May 16, 2002, discloses an electronic throttle control accelerator pedal mechanism with a mechanical hysteresis provider (requiring increased pressure to accelerate a vehicle as compared to maintaining the vehicles speed).

US 2005/0274217, invented by K. D. Dubay et al. and published on Dec. 15, 2005, discloses a transmission gear selector switch on a shift lever. The gear selector and the shift lever each control the selection from among different pluralities of gear arrangements. The first set of gear arrangements includes park, reverse, neutral, drive, and low. The second set of gear arrangements includes a first low arrangement and a second low arrangement.

US 2009/0178647, invented by C. C. Wang and published on Jul. 16, 2009, discloses a fuel feeding mechanism of a vehicle with an accelerator pedal position sensor. The throttle includes a throttle position sensor. A minimum and maximum engine speed rotation is set by the driver. The electronic control will compare the throttle position sensor, accelerator position sensor, and rotational speed of the engine to adjust the throttle position and fuel injection to provide earlier gear shifting than would otherwise occur.

US 2012/0143420, invented by H. Fisker et al. and published on Jun. 7, 2012, discloses a control system for a vehicle having a rechargeable energy storage system as well as an engine. The drive motor is operatively connected to both the energy storage system and the engine. The vehicle may be adjusted so that it is powered by the energy storage system alone, the engine alone, or both the engine and energy storage system.

US 2013/0046450, invented by M. Gentile et al. and published on Feb. 21, 2013, discloses a control system for shifting an automatic transmission. The control system receives information about the vehicle speed as well as the angular position of the accelerator pedal. This information is utilized to determine whether the vehicle is traveling on level ground, uphill, or downhill. Transmission shifting is adjusted accordingly.

US 2014/0297153, invented by M. Tagaki et al, and published on Oct. 2, 2014, discloses a vehicle driving force control device. The electronic control unit includes accelerator pedal sensor, a vehicle speed sensor, and an acceleration sensor. A target acceleration is calculated, and drive force is limited if the actual acceleration exceeds the target acceleration.

US 2016/0004271, invented by D. A. Gregory et al. and published on Jan. 7, 2016, discloses an accelerator pedal assembly. The pedal includes an electromagnetic resistance mechanism that is configured to provide a force to resist movement of the accelerator pedal by the operator to indicate an operational condition of the vehicle to the operator.

US 2016/0076638, invented by S. Taka et al. and published on Mar. 17, 2016, discloses a vehicle shift controller including a state time integrating device that integrates the state time of an accelerator pedal in each pedal stroke position within a predetermined stroke range including a click position. A stroke sensor connected to the spindle of the accelerator pedal detects the stroke position based on the angle of rotation of the spindle. The stroke is converted into a voltage signal which is provided to an electronic control unit. The panel has a collector mechanism for giving a click feeling to pedal reaction force during depression of the panel. The shift controlling means is based on a shift map having the parameters of the vehicle speed and accelerator pedal opening degree. Depressing the accelerator pedal past the kickdown position results in sudden opening of the accelerator pedal as accelerator pedal resistance decreases (having previously increased at the kick position), resulting in a kickdown of the automatic transmission. The pedal stroke is converted to a control stroke using a map. A kickdown occurs when the control stroke exceeds the kickdown stroke. The map modifies the rate of increase for the control stroke relative to the pedal stroke so that the kickdown stroke is consistent from vehicle to vehicle. The control stroke is then applied to the shift map. The shift map is then used to determine when a kickdown occurs. The state time integrating means integrates the state time of the accelerator pedal in each position, so that the click position of the accelerator pedal can be determined as the position where the state time integrated by the state time integrating means is the shortest.

US 2016/0202719, invented by D and published on Jul. 14, 2016, discloses a system for pressure activated pedal control. A first sensor is configured to produce an output in response to a user applied force. A second sensor is configured to produce an output corresponding to a release of user applied force. A controller is configured to control one of a brake system, a clutch system, and a throttle system based on the first and second outputs. The system is intended to eliminate the need for pedal movement, which results in mechanical complexity as well as the possibility of pedal movement being blocked. Piezoelectric sensors can be used to interpret a force applied to the pedal as well as a force removed from the panel. The signals generated by a movement based pedal system can thus be mimicked.

CN 101462493, invented by R. Huang et al. and published on Jun. 24, 2009, discloses an intelligent braking control for a vehicle. If excessive pressure is applied to the accelerator pedal, the control assumes that the driver intended to depress the brake pedal due to an emergency, but instead depressed the accelerator pedal.

CN 202080192, invented by G. Feng et al. and published on Dec. 21, 2011, discloses a speed reduction system for an electronic accelerator pedal.

DE 102005002265, invented by E. Fuchs et al. and published on Aug. 3, 2006, discloses a method for controlling the drive system of a vehicle based on the accelerator position as well as the drag torque.

EP 0 507 745, invented by G. Fenaroli and published on Oct. 7, 1992, discloses a control system for a hydraulic retarder in commercial vehicles. A pedal operates a retarder when depressed to a first position, and also activates exhaust braking when fully depressed. A hand control near the steering wheel serves to further close the retarder when activated by the driver.

EP 0 838 362, invented by F. Darmon et al. and published on Apr. 29, 1998, discloses an electronic accelerator pedal for motor vehicles.

EP 1 186 805, issued to L. Sang-Joo on Oct. 8, 2003, discloses a shift lever apparatus for an automatic transmission with a manual transmission mode.

JP 2000002320, invented by W. Kazuake et al. and published on Jan. 7, 2000, discloses a control device for a vehicle. The control device selects a shift diagram for controlling the gear ratio of the automatic transmission based on the detection of a kickdown.

Another example of the use of a controller activated by the driver's left foot is used by Richie Parker, an individual who was born without arms. A dial controlled by Mr. Parker's left foot is used to steer his car. The dial controller is shown in the YouTube video https://www.youtube.com/watch?v=usuQAYE2ASo.

Accordingly, there is a need for a vehicle control system that simplifies control of the various driving modes available to the driver. There is an additional need for a vehicle control system that frees up the driver's hands to perform other tasks, while taking advantage of the availability of the driver's left foot to perform vehicle control functions.

SUMMARY

The above needs are met by a vehicle control device. The vehicle control device comprises a user-depressible portion that is structured to move between a rest position and a depressed position, and which is biased towards the rest position. The vehicle control device further includes a signal generation portion which is structured to provide a signal indicating the position of the user-depressible portion when the user-depressible portion is at the rest position, at the depressed position, or anywhere therebetween. The vehicle control device further includes a microcontroller. The microcontroller is operatively connected to the signal generation portion. The microcontroller is structured to receive the signal from the signal generation portion, to determine a type of movement of the user-depressible portion based on the signal, and to correlate the type of movement to one of a plurality of predetermined vehicle control actions.

The above needs are further met by a method of controlling functions within a vehicle. The method comprises providing a vehicle control device. The vehicle control device includes a user-depressible portion that is structured to move between a rest position and a depressed position, and which is biased towards the rest position. The device further includes a signal generation portion that is structured to provide a signal indicating the position of the user-depressible portion when the user-depressible portion is at the rest position, at the depressed position, or anywhere therebetween. The device also includes a microcontroller that is operatively connected to the signal generation portion. The microcontroller is structured to receive the signal from the signal generation portion, to determine a type of movement of the user-depressible portion based on the signal, and to correlate the type of movement to one of a plurality of predetermined vehicle control actions. The method further includes determining an first position of the user-depressible portion, and determining a second, subsequent position of the user-depressible portion. A type of movement is determined from the first position and second position. The type of movement is correlated to one of a plurality of predetermined vehicle control functions. The system then executes the vehicle control function correlated to the type of movement.

These and other aspects of the invention will become more apparent through the following description and drawings.

BRIEF DESCRIPTION OF THE DRAWINGS

FIG. 3A is a schematic representation of driver input from a vehicle control being processed to determine the driver's desired action, using a separate microcontroller to receive the signal from the pedal and to provide an appropriate signal to the vehicle's pre-existing computer system.

FIG. 3B is a schematic representation of driver input from a vehicle control being processed to determine the driver's desired action, using the vehicle's pre-existing computer system.

Like reference characters denote like elements throughout the drawings.

DETAILED DESCRIPTION

Figure 2:
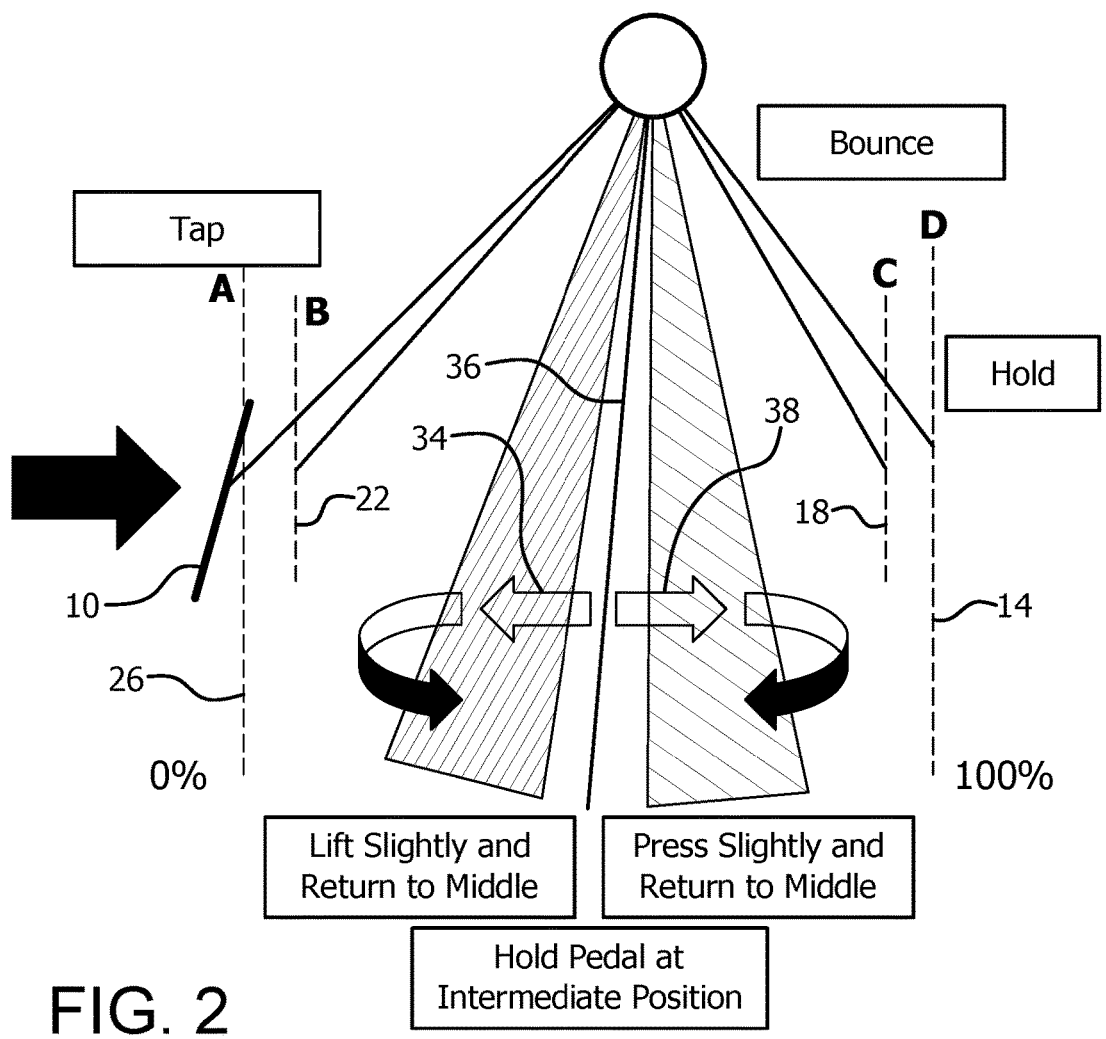
FIG. 2 is a schematic representation of possible vehicle control movements, utilizing the example of a foot pedal.

Referring to the drawings, a vehicle control system is illustrated. In the illustrated example, the vehicle control system utilizes a vehicle control input device, which can be a user-depressible vehicle control device such as a button, pedal, or the like. In the illustrated example, the vehicle control device is a foot pedal 10 (FIG. 2). The illustrated example of the foot pedal 10 is located to the left of a brake pedal in a typical vehicle, where the pedal 10 is conveniently located for activation by the driver's left foot.

Figure 1:
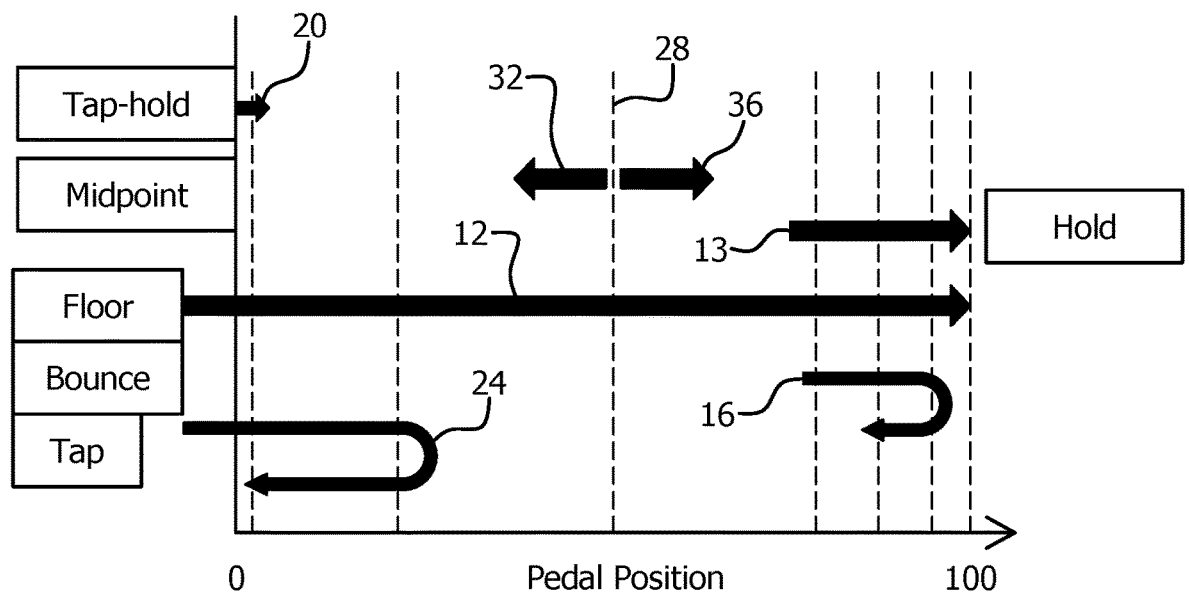
FIG. 1 is a graphical representation of possible vehicle control movements, utilizing the example of a foot pedal.
Figure 5:
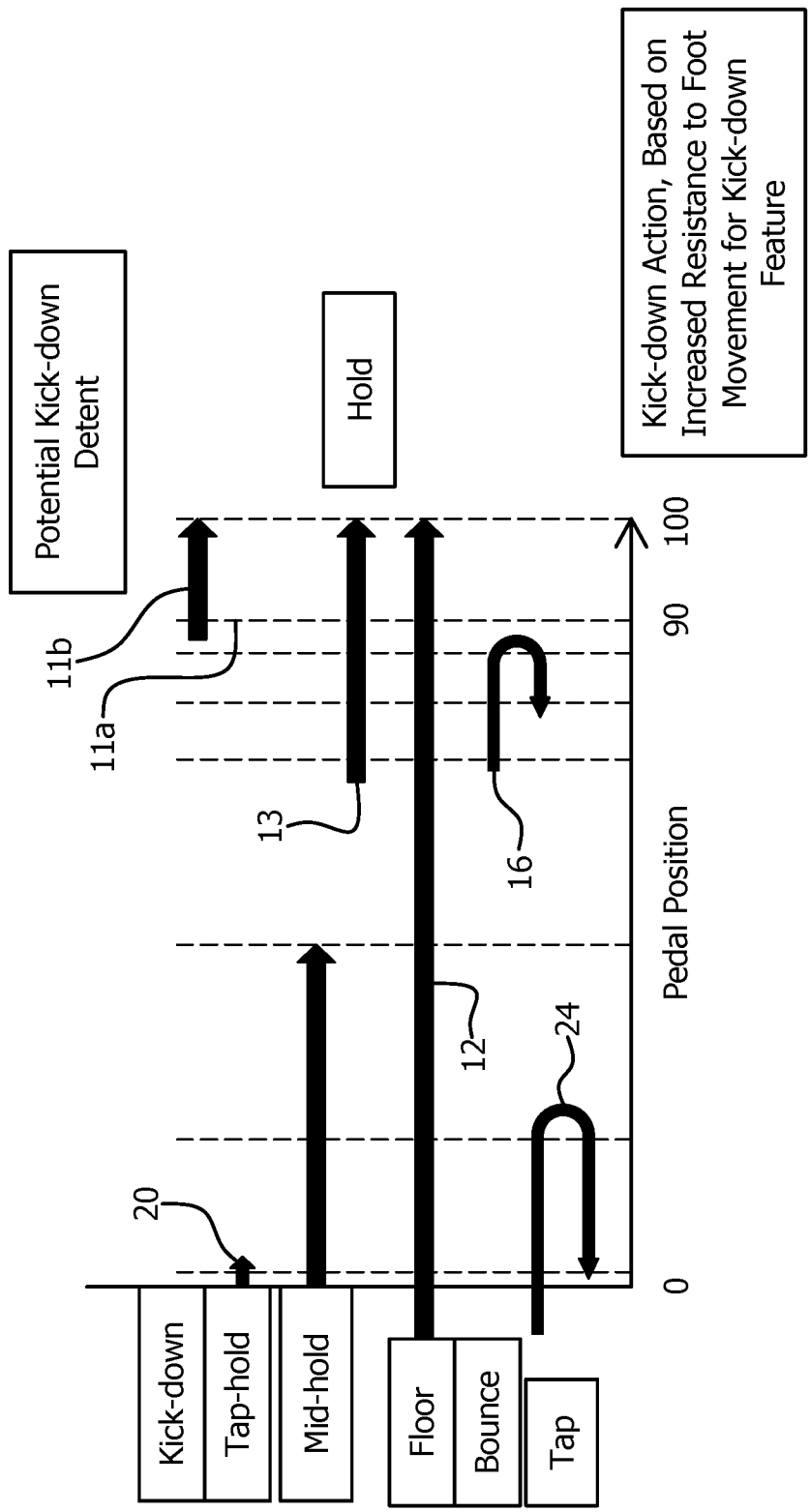
FIG. 5 is a graphical representation of possible vehicle control movements, utilizing the example of a foot pedal.

Referring to FIGS. 1-2 and 5, the foot pedal 10 can be activated in a variety of different manners, each of which may activate a different vehicle function, depending upon the specific action selected, as well as the engine and driving conditions occurring when the control action is performed. Thus, the foot pedal 10 can be used to control a variety of vehicle functions which would otherwise be controlled by individual hand operated controls. Examples of kickdown pedals which could be utilized in connection with the invention include, but are not limited to, those disclosed in U.S. Pat. Nos. 6,209,418 and 6,474,191, and the entire disclosures of both patents are expressly incorporated by reference.

FIGS. 1 and 5 differ primarily in the illustration of a "kick down" feature in FIG. 5, which is activated when the pedal is taken across line 11a, as shown by arrow 11b. The kick-down feature provides feedback to the driver about the position of the pedal, for example, by providing a detent and/or by a means of increasing the force required to depress the pedal beyond this point. Although the illustrated example of the kickdown feature is activated at about 90% depressed, the kickdown feature could be structured to be activated at any desired point in pedal travel. Another example would be activating the kickdown feature at the midpoint of pedal travel. Yet another example might include more than one kickdown point, with more than one corresponding increase in the amount of force needed to depress the pedal, in order to provide more precise indication of the location of the pedal.

For example, the pedal 10 may be pressed all the way to the floor through its entire range of motion, known as flooring the pedal. Flooring the pedal is illustrated by line 12 in FIGS. 1 and 5, as well as position 14 in FIG. 2. If the pedal is taken to the floor beginning from a partially depressed position, illustrated by the line 13 in FIGS. 1 and 5, this is known as a "hold" movement. As another example, the pedal 10 may be taken all the way to its lowermost position adjacent to the floor of the vehicle, and then retracted slightly, which will be referred to herein as a "bounce full" movement. A bounce full movement is illustrated by line 16 in FIGS. 1 and 5, as well as position 18 in FIG. 2. As another alternative, the pedal may be depressed slightly and held in position, which herein will be called a "tap-hold" movement. A tap hold movement is illustrated by line 20 in FIGS. 1 and 5, as well as by position 22 in FIG. 2. The pedal can be depressed slightly and then raised slightly, which will be called a "tap" herein. A tap is illustrated by line 24 in FIGS. 1 and 5, as well as position 26 in FIG. 2. If a tap occurs multiple times in succession, this will be referred to as a "double tap" or "multiple tap." As yet another alternative, the pedal may be held at the midpoint of its range of motion, as shown by position 28 in FIG. 1, and positioned 30 in FIG. 2. Raising the pedal from this position, which will be referred to herein as "midpoint backward," can actuate one function, while lowering the pedal slightly, which will be referred to herein as "midpoint forward," can actuate a different function. A midpoint backward movement is illustrated by line 32 in FIG. 1, and arrow 34 in FIG. 2. A midpoint forward movement is illustrated by line 36 in FIG. 1, and by arrow 38 in FIG. 2.

The vehicle control system receives information about the movements of the pedal 10, as well as information about the engine, transmission, and other driving conditions. The engine speed, vehicle speed, current transmission gear, whether the accelerator or brake pedal of the vehicle is being depressed, and to what extent either of these pedals is being depressed, as well as other factors, can all be taken into account in determining the action to perform in response to a specific type of pedal activation. Depending on the type of vehicle in which the pedal is installed, different sets of functions may be associated with different pedal activations.

The pedal 10 in the illustrated example may be an electronic pedal. Examples of suitable pedals include the pedals described within U.S. Pat. No. 6,220,222, issued to A. Kalsi on Apr. 24, 2001; U.S. Pat. No. 6,809,512, issued to D. S. Pfaffenberger et al. on Oct. 26, 2004; and U.S. Pat. No. 6,474,191, issued to A. Campbell on Nov. 5, 2002. The entire disclosures of all three patents are expressly incorporated herein by reference. Such electronic pedals include a position sensor for determining the position of the pedal, and generating an electric signal based on the position of the pedal. This electric signal can be provided to a controller that may be the pre-existing vehicle control system (adapted to receive and process such a signal), or may be an additional controller added to the vehicle which communicates the desired instructions to the existing vehicle control system. The specific pre-existing control system will vary depending on the vehicle with which the pedal 10 is used, as well as the tasks the pedal 10 is to perform. The signal from either the pedal 10 or from a separate microcontroller may communicate the desired signal to a transmission controller, engine controller, powertrain controller, body control module, or other pre-existing control system. If other devices are added to the vehicle in order to carry out the functions controlled by the pedal (which may be the case if the other devices are added to the vehicle after the vehicle is manufactured), then the pedal's microcontroller may feed control signals into the controllers for these devices.

If a separate microcontroller is used to receive the electrical signal, then that separate microcontroller can be selected from a variety of different types of controllers. Possible microcontrollers include general-purpose programmable microcontrollers, programmable logic devices such as field programmable gate arrays, application specific integrated circuits, and custom integrated circuits. This microcontroller can be programmed to receive not only the electrical signal from the pedal position sensor, but also any additional required information about the current engine, transmission, and/or driving conditions that may be necessary to convert the position signal from the pedal into a vehicle control signal that can be acted upon by the vehicle's pre-existing computer. Once the desired action is determined from the pedal position and any relevant vehicle information, the appropriate signal is sent to the vehicle's computer to execute the desired action.

FIG. 3A illustrates the use of a separate controller to accept the signal from the pedal 10, and then provide the appropriate control signal to the vehicle's computer. The system would be particularly advantageous for aftermarket conversion of a vehicle that was not originally manufactured to include a multi-function vehicle control 10. The specific functions which will be selected by the multi-function vehicle control may have already been built into the vehicle by the manufacturer, or may be added by adding other components to the vehicle. Thus, in some instances, the vehicle's computer system will already contain inputs designed to accept control signals from presently existing vehicle control devices. Thus, for many configurations, the output pins for the microcontroller 40 can be connected directly to the input pins of the vehicle's computer that have already been configured to accept the appropriate signals for instructing the computer to carry out the desired actions. The sensor from the pedal 10 is operatively connected to the microcontroller 40, which interprets the signal from the pedal as described in greater detail below. Once the driver's desired action is determined, the appropriate signals are provided to the body control module 42 as well as the engine control module 44. The body control module 42 then provides the appropriate signals to the engine control module 44 and/or transmission control module 46 to carry out the desired action. The specific operative connection of one controller to another will vary from vehicle to vehicle. For example, some vehicles utilize a single powertrain control module instead of separate engine and transmission control modules.

FIG. 3B illustrates the use of the vehicle's pre-existing controller to accept and interpret the signal from the pedal 10. In this instance, the signal from the pedal 10 is provided directly to the body control module 48, as well as to the engine control module 50. Again, the specific operative connections between the pedal and the various controllers will vary from vehicle to vehicle, and in some examples, the pedal may only be connected to one of the body control module 48 or engine control module 50. The body control module 48 determines the driver's desired action, and sends the appropriate signals to the engine control module 50 and/or transmission control module 52.

Figure 4A:
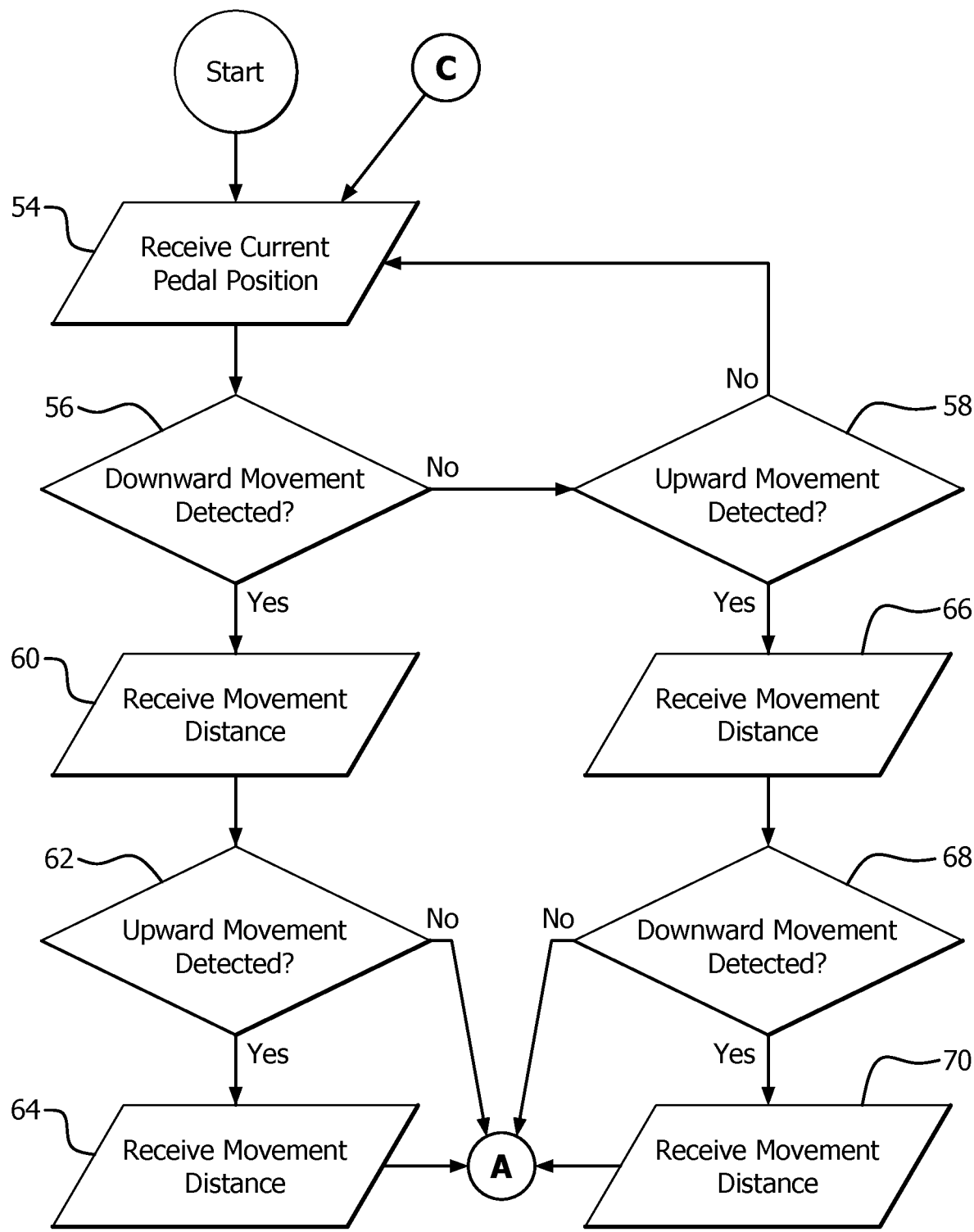
FIG. 4A is a flowchart illustrating detecting a driver-initiated vehicle control activation.
Figure 4B:
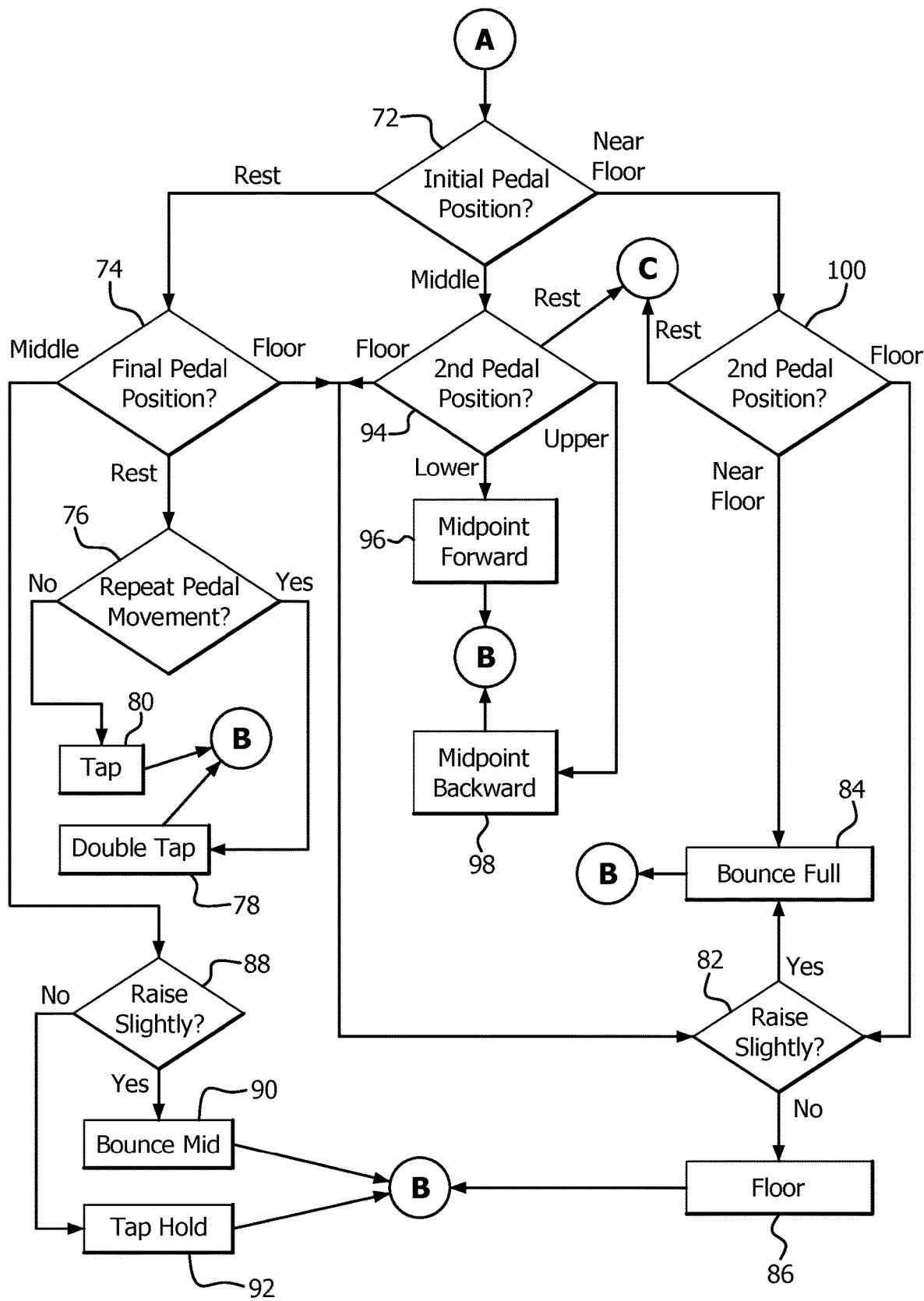
FIG. 4B is a flowchart illustrating categorizing the vehicle control activation detected in FIG. 4A.
Figure 4C:
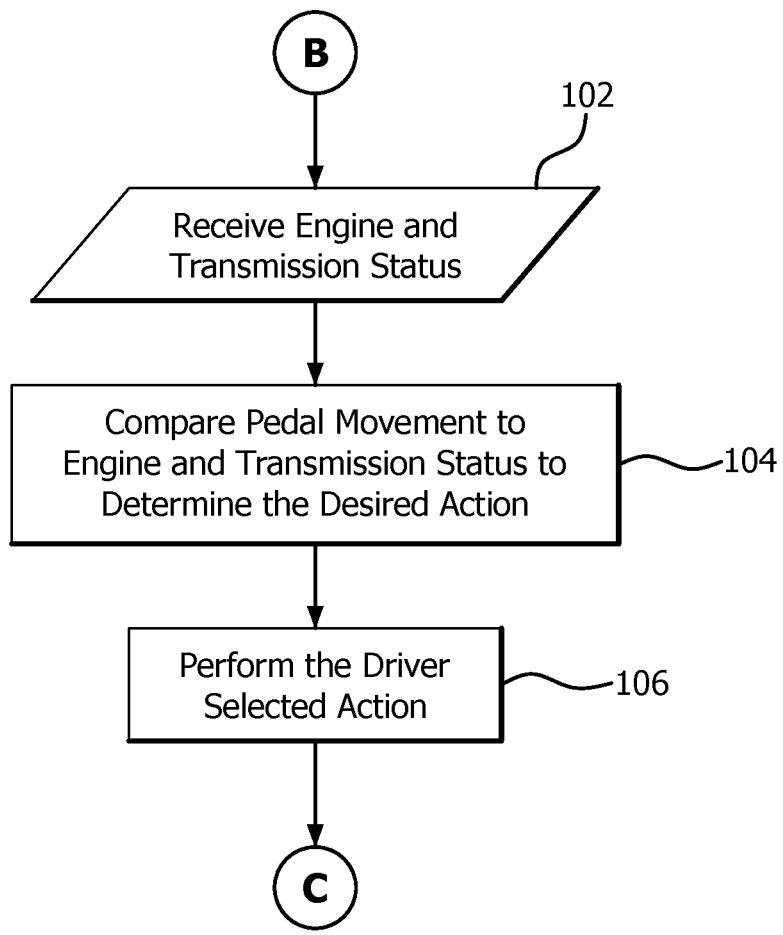
FIG. 4C is a flowchart illustrating carrying out the instructions associated with the vehicle control activation that was categorized in FIG. 4B.

The process carried out by the controller 40 and/or body control module 48 is illustrated in FIGS. 4A-4C. The process of monitoring and receiving the signals from a position sensor indicating pedal position and movement is illustrated in FIG. 4A. The process begins with receiving the current position of the pedal 10 at step 54. With the current pedal position known, the system then monitors for downward pedal movement at step 56 and for upward pedal movement at step 58, continuing to perform monitoring until movement is detected. If a downward pedal movement is detected, then the movement distance is received at step 60. The system next checks to see if a subsequent upward movement is detected at step 62, and if so, the movement distance is received at step 64. Similarly, if an upward movement is detected at step 58, the movement distance will be received at step 66. The system will then check for a subsequent downward movement at step 68. If a subsequent downward movement is detected, the movement distance is received at step 70. Once the movement direction and distance has been identified, and any return movement has also been identified, the system can begin to characterize the movement.

Characterization of the previously detected pedal movement is illustrated in FIG. 4B. Characterization of the movement begins by identifying the initial pedal position at step 72. If the initial pedal position was at rest, the final pedal position is then identified at step 74. If the final pedal position is also at rest, then the system examines whether the pedal movement was repeated at step 76. If so, the movement is characterized as a double tap at step 78. If not, the movement is characterized as a tap at step 80. If the pedal 10 has been taken from at rest all the way to the floor, the system then checks to see if the pedal is subsequently raised slightly at step 82. If so, the movement is characterized as bounce full at step 84. If not, the movement is characterized as flooring the pedal at step 86. If the pedal has been taken from the rest position to a middle position (not necessarily a midpoint, but some position below the rest position), then the system checks to see if the pedal has been raised slightly from the middle position at step 88. If so, the movement is characterized as bounce middle at step 90. If not, the movement is characterized as a tap hold at step 92.

If the initial pedal position was in approximately the middle of the pedals range of travel, then the final pedal position is examined at step 94. If the final pedal position is at the floor, the system then checks to see if the pedal is subsequently raised slightly at step 82. If so, the movement is characterized as bounce full at step 84. If not, the movement is characterized as flooring the pedal at step 86. If the pedal was not floored, but was merely lowered a small amount, then the movement is categorized as midpoint forward at step 96. If the pedal was raised slightly, and the movement is characterized as midpoint backward at step 98. If the pedal is raised all the way to its rest position, the system will not perform any functions, but will merely continue to monitor the pedal, with the starting point for the next pedal position being the rest position.

If the pedal 10 began movement in a position near the floor, then the second pedal position will be checked at step 100. If the final pedal position is at the floor, the system then checks to see if the pedal is subsequently raised slightly at step 82. If so, the movement is characterized as bounce full at step 84. If not, the movement is characterized as flooring the pedal at step 86. Alternatively, if the final pedal position is near the floor, but not at the floor, the movement is also characterized as a bounce full movement at step 84. If the pedal is raised all the way to its rest position, the system will not perform any functions, but will merely continue to monitor the pedal, with the starting point for the next pedal position being the rest position.

Referring to FIG. 4C, once the pedal movement has been detected and characterized, it can then be compared to the current driving, engine, and/or transmission conditions in order to determine the driver's desired action. Any relevant driving, engine, and/or transmission conditions are received at step 102, for example, accelerator pedal position, brake pedal position, current gear, whether the transmission is being used in automatic or manual mode, vehicle speed, engine speed, or any other information determined to be relevant by those configuring the system. The pedal movement is then taken into consideration along with any relevant engine conditions at step 104.

Depending on the specific type of vehicle as well as the specific vehicle options available, numerous functions may be controlled by various pedal movements. As an example, a tap on the pedal 10 may activate exhaust braking if the brake pedal is depressed when the tap occurs. Once all of the relevant information has been identified and received by the microcontroller 40 or body control module 48, a lookup table or decision tree can be used to correlate the specific pedal movement with the specific action being selected by the driver. The appropriate control signal can then be sent to execute the desired action at step 106.

As one example of how a pedal 10 could be implemented, a light duty pickup truck could use the pedal 10 to control various functions which are typical of such trucks. For example, a "tap" could be used to select tow/haul mode (altering the transmission shift schedule and torque converter control) when the transmission is in "drive," or to otherwise change the gear shifting calibration map to emphasize efficiency, power, or braking. If the transmission is in manual mode, then a tap might initiate an upshift. A tap may also be used to turn off the exhaust brake. A "bounce" may be used to change the engine performance state (which may provide greater power or greater fuel efficiency than a default engine performance state) when the transmission is in "drive." If the transmission is in manual mode, then a "bounce" may initiate a downshift. A "hold" may turn on or off the exhaust brake, depending on the duration of the "hold." A "floor" may activate an auxiliary input defined by the driver, with the "hold" feature disabled if the "floor" feature is enabled, thus preventing misinterpretation of a driver input.

As another example, medium and heavy-duty trucks may utilize a similar system to that described above, although some examples may provide fewer driver options if this is desired by the employer of the driver. In some examples, the third pedal may be limited to gear shifting and engine braking.

As another example, electric vehicles, hybrid electric vehicles, and plug in hybrid electric vehicles would be set up to initiate a different set of functions based on the action performed on the pedal 10. A "tap" and "bounce" could be used to control regenerative braking levels, while a "floor" could provide a performance mode to spool up the engine and/or increase the amount of power available, including shifting gears under specified conditions in some examples.

As yet another example, holding the third pedal in a middle position could switch from automatic to manual shifting. Temporarily lowering the pedal could either upshift or downshift, while temporarily raising the pedal could perform the opposite shifting operation. A further example may utilize an extended hold to change modes. For example, a two second hold may turn on the exhaust brake, and a seven second hold may change modes. Such a mode change could, in some examples, enter a mode for racing or other unconventional driving situations.

A further example utilizes three pedal movements, a "tap," a "bounce," and a "hold," to activate three related functions, three different functions, or a combination of two related functions and an unrelated function. If a kickdown feature is included, the kickdown feature can be utilized to distinguish a "tap" from a "bounce," for example, a pedal press that stops above the kickdown point before returning to rest is a "tap," and a pedal press that reaches the kickdown point before returning partially or totally to rest is a "bounce." A pedal press that remains below the kickdown point can be a "hold."

A variety of modifications to the above-described embodiments will be apparent to those skilled in the art from this disclosure. In particular, numerous combinations of pedal movements and controlled functions may be utilized, which are too numerous to describe, but which will be obvious to those skilled in the art from this description. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A vehicle control device, comprising:
   a user-depressible portion, the user-depressible portion being structured to move between a rest position and a depressed position, the user-depressible portion being biased towards the rest position;
   a signal generation portion, the signal generation portion being structured to provide a signal indicating the position of the user-depressible portion when the user-depressible portion is at the rest position, at the depressed position, or anywhere therebetween; and
   a microcontroller, the microcontroller being operatively connected to the signal generation portion, the microcontroller being structured to receive the signal from the signal generation portion, the microcontroller having memory containing executable instructions to determine a type of movement of the user-depressible portion based on the signal, to perform a first vehicle control action in response to a first type of movement, and to perform a second vehicle control action in response to a second type of movement, the first type of movement and second type of movement being selected from the group consisting of a tap, a double tap, a tap-hold, a bounce midpoint, a midpoint forward, a midpoint backward, a bounce full, or a floor.

2. The vehicle control device according to claim 1, wherein the user-depressible portion is a foot pedal.

3. The vehicle control device according to claim 2, wherein the foot pedal includes a kickdown indicator.

4. The vehicle control device according to claim 1, wherein the microcontroller is structured to continue performance of at least one of the first vehicle control action and second vehicle control action after release of the user-depressible portion.

5. A method of controlling functions within a vehicle, the method comprising:
   providing a vehicle control device, comprising:
      a user-depressible portion, the user-depressible portion being structured to move between a rest position and a depressed position, the user-depressible portion being biased towards the rest position;
      a signal generation portion, the signal generation portion being structured to provide a signal indicating the position of the user-depressible portion when the user-depressible portion is at the rest position, at the depressed position, or anywhere therebetween; and
      a microcontroller, the microcontroller being operatively connected to the signal generation portion;
   determining an first position of the user-depressible portion;
   determining a second position of the user-depressible portion, the second position occurring later in time than the first position;
   determining a type of movement from the first position and second position, the type of movement being selected from the group consisting of a tap, a double tap, a tap-hold, a bounce midpoint, a midpoint forward, a midpoint backward, a bounce full, or a floor;
   selecting a first predetermined vehicle control function if a first predetermined movement type is selected, and selecting a second predetermined vehicle control function if a second predetermined movement type is selected; and
   executing the vehicle control function correlated to the type of movement.

6. The method according to claim 5, further comprising:
   determining a third position of the user-depressible portion, the third position occurring later in time than the second position; and
   determining the type of movement from the first position, second position, and third position.

7. The method according to claim 6, further comprising:
   determining a number of repetitions of the type of movement that was determined from the positions of the user-depressible portion; and
   determining a type of movement from the first position, second position, third position, and number of repetitions of the movement.

8. The method according to claim 5, further comprising:
   determining a number of repetitions of the type of pedal movement that was determined from the positions of the user-depressible portion; and
   determining a type of movement from the first position, second position, and number of repetitions of the movement.

9. The method according to claim 5, further comprising continuing performance of at least one of the first vehicle control action and second vehicle control action after release of the user-depressible portion.

\* \* \* \* \*